United States Patent [19]
Parthasarathy et al.

[11] Patent Number: 5,740,273
[45] Date of Patent: Apr. 14, 1998

[54] METHOD AND MICROPROCESSOR FOR PREPROCESSING HANDWRITING HAVING CHARACTERS COMPOSED OF A PREPONDERANCE OF STRAIGHT LINE SEGMENTS

[75] Inventors: Kannan Parthasarathy; John L. C. Seybold, both of Palo Alto, Calif.

[73] Assignee: Motorola, Inc., Schaumburg, Ill.

[21] Appl. No.: 701,571

[22] Filed: Aug. 22, 1996

Related U.S. Application Data

[63] Continuation of Ser. No. 463,366, Jun. 5, 1995, abandoned.
[51] Int. Cl.$^6$ .................. G06K 9/10; G06K 9/42
[52] U.S. Cl. .............. 382/187; 382/106; 382/264; 382/298
[58] Field of Search .................. 382/186, 187, 382/123, 298, 264

[56] References Cited

U.S. PATENT DOCUMENTS

| | | | |
|---|---|---|---|
| 4,653,107 | 3/1987 | Shojima et al. | 382/187 |
| 5,023,918 | 6/1991 | Lipscomb | 382/187 |
| 5,038,382 | 8/1991 | Lipscomb | 382/187 |
| 5,442,715 | 8/1995 | Gaborski et al. | 382/187 |
| 5,467,407 | 11/1995 | Guberman et al. | 382/186 |

OTHER PUBLICATIONS

"Attributed String Matching by Split-and-Merge for On-Line Chinese Character Recognition", Yih-Tay Tsay and Wen-Hsiang Tsai, IEEE Transactions on Pattern Analysis and Machine Intelligence, vol. 15, No. 2, Feb. 1993, pp. 180-185.

*Primary Examiner*—Andrew Johns
*Assistant Examiner*—Monica S. Davis
*Attorney, Agent, or Firm*—J. Ray Wood

[57] ABSTRACT

The method and microprocessor of the present invention includes a step of calculating the angle changes, in the handwritten input. The method then selects potential segmentation points in the input whose angle change exceeds a predetermined threshold. The segmentation points are used to determine a sequence of straight line strokes that may be used by a recognizer for interpretation of the handwritten input.

30 Claims, 3 Drawing Sheets

METHOD AND MICROPROCESSOR FOR PREPROCESSING HANDWRITING HAVING CHARACTERS COMPOSED OF A PREPONDERANCE OF STRAIGHT LINE SEGMENTS

This is a continuation of application Ser. No. 08/463,366, filed Jun. 5, 1995, which is herein incorporated by reference and now abandoned.

FIELD OF THE INVENTION

This invention relates generally to handwriting recognition, and more particularly to a method of stroke segmentation of handwritten input.

BACKGROUND OF THE INVENTION

Machine recognition of human handwriting is a very difficult problem, and with the recent explosion of pen-based computing devices, has become an important problem to be addressed. There exist many very different approaches to this problem, but one useful approach has been to divide the writing into a sequence of fundamental movements, or "strokes", and use the strokes (which are parametrized in some way) as inputs to a stroke-based character recognizer.

A key requirement in a stroke-based recognizer is that multiple instances of the same character class (e.g. the letter "A" written at different times and by different writers) should be divided into a similar set of strokes each time. This helps insure that recognition is not too difficult, because the description of the character instances will "look" similar to the character recognizer itself. In the ideal case, all instances of a given character would always contain the same number of strokes, the strokes would all be in the same relative locations, and the featural descriptions of the strokes would all be very similar across the instances. This ideal is not achievable in practice, but to the extent it can be approached, recognition accuracy can be improved.

In one technique in the prior art, stroke boundaries are set at points where pen velocity in the vertical (or "y") direction is zero—that is, at points where the writing begins moving upward, or begins moving downward. The resulting set of strokes may then be called "upstrokes" and "downstrokes". This method is discussed in Mermelstein & Eden "Experiments on Computer Recognition of Connected Handwritten Words", in *Information And Control* vol. 7, pp. 255–270, 1964. One problem with this method is that it is overly sensitive to changes in the vertical direction, and not sensitive at all to changes in the horizontal direction. Yet many characters are composed of horizontal pieces—for example, the cross of a "t" and the three prongs of an "E" are normally much more horizontal than vertical, even in sloppy writing. A y-velocity based stroke segmenter will sometimes break a horizontal piece into one stroke, but often it will be broken into two, three, or even many more, simply because of small jitters of the pen in the vertical direction. This leads to poor recognition accuracy, because multiple instances of the same character will often be segmented into different-looking sets of strokes. Attempts to correct the inaccuracies of this method, including requiring a minimum vertical direction change before creating a new stroke have had only limited success, and many of the same basic problems still remain.

Accordingly a need exists for a stroke segmentation technique that is more accurate and not subject to the problems in the methods discussed, such as the y-velocity method.

DETAILED DESCRIPTION OF THE PREFERRED EMBODIMENTS

Typically, handwritten character input is collected from the user in the form of discrete continuous segments. A discrete continuous segment consists of one or more pen segments, where a pen segment is the mark left by a pen during its period of contact with an input device such as a digitizing tablet or paper.

In the present invention one or more discrete continuous segments are the units of handwritten input being segmented into strokes. A stroke is a straight line approximation of the actual handwritten input. Handwritten input is input which is captured electronically that includes but is not limited to the following: handwritten input; electronic input; input captured through pressure, such as stamped input; input that is received electronically, such as via facsimile, pager, or other device.

A segment is represented as a sequence of points sampled at approximately regular intervals by the input device. Each point is described at minimum by an X coordinate, an Y coordinate, and a pen state. A pen state indicates whether the pen is in contact with the tablet and can take only one of two values (pen up and pen down). Segments may be captured electronically using a digitizing tablet, or alternatively may be derived from a scanned or faxed image through a process of line detection in the image; such methods of capturing electronically are understood in the art. In a preferred method handwritten input is accepted by a device, such as a personal digital assistant (PDA) or other device. Other devices that function to receive handwritten input include, but are not limited to, the following: computers, modems, pagers, telephones, digital televisions, interactive televisions, devices having a digitizing tablet, facsimile devices, scanning devices, and other devices with the ability to capture handwritten input. Generally, when handwritten inputs are captured electronically, each point is represented by a pixel, such that a segment is represented by a series of pixels on the device.

In accordance with the present invention, handwritten input may be in the form of alphanumeric characters, ideographic characters or other forms of characters or symbols of written communication.

Figure 1:
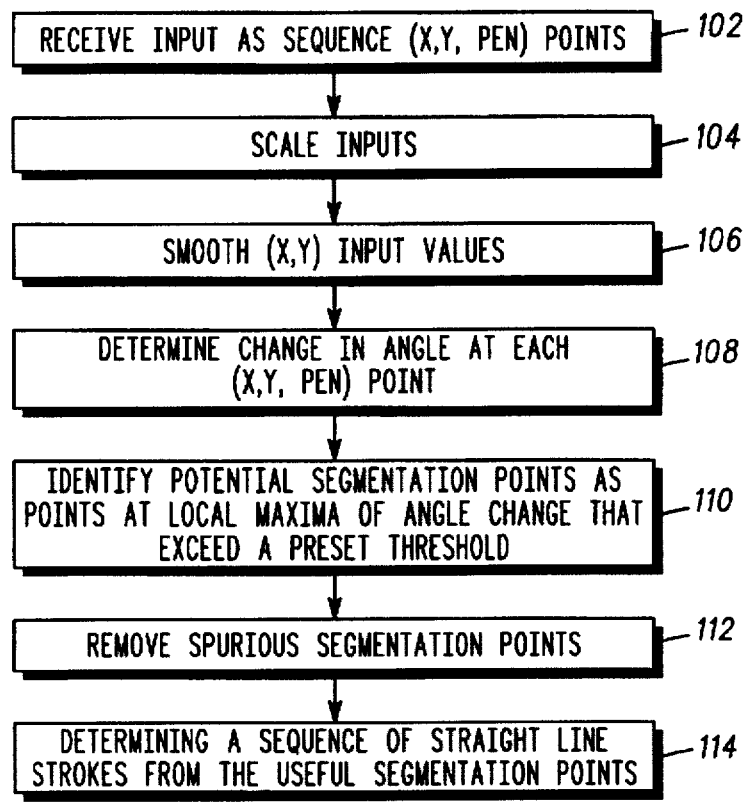
FIG. 1 illustrates a flow diagram of operation for identifying stroke boundaries in accordance with a preferred embodiment of the present invention.

In the present technique, stroke boundaries are obtained as points where the angle change is a local maximum and exceeds a predetermined threshold value that corresponds to sharp bends in the writing. Since a sharp bend can occur regardless of the direction the pen is moving, this method is not sensitive to the orientation of the various parts of handwritten input, such as words or characters. Referring now to FIG. 1, FIG. 1 illustrates a flowchart of a preferred method in accordance with the teachings of the present invention. Handwritten input from the digitizer or other device is received in the form of x, y coordinates and associated penup or pendown states (102). Typically these points are represented by pixels. Where selected, the x, y inputs are scaled (104) so the resulting coordinate values are within prespecified limits. Where selected, the scaled x, y coordinates are smoothed (106) to remove high-frequency noise arising from the digitizing tablet. Smoothing is done by averaging the coordinates (x,y) of a point with its neighbors (weighting the point itself and the nearest points higher), and replacing the (x,y) coordinate values of the point in question with the computed average. Preferably, the smoothing window size is fixed. Smoothing is not done across two separate pendown segments. Upon joining the previous point to the current point, a first vector is formed. A second vector is formed by joining the current point to the next point. The angle between the first vector and the second vector, which represents the angle change at the current point (see FIG. 6 ), is then determined (108). Potential segmentation points are identified as pendown points at local maxima of the angle changes that exceed a preset threshold (110) (see FIG. 7). The preset threshold is selected to maximize true segmentation points and to minimize false segmentation points (e.g., a segmentation point caused by jitter). Then, spurious segmentation points are removed (112). For example, 'hooks', i.e., short pen movements at beginning/end of pen down segments, are removed, and where an angle change at a first segmentation point is less than the angle change at a second segmentation point that lies within a preset distance from the first segmentation point, the first segmentation point is deleted. Then, a sequence of straight line strokes are determined from the useful segmentation points (114). Straight line segments are also introduced between two segmentation points that have a penup between them.

Each straight line stroke is typically described by four parameters: x coordinate of a midpoint of the straight line stroke, y coordinate of the midpoint of the straight line stroke, a length of the straight line stroke, and an angle of the straight line stroke with respect to a predetermined reference.

Figure 2:
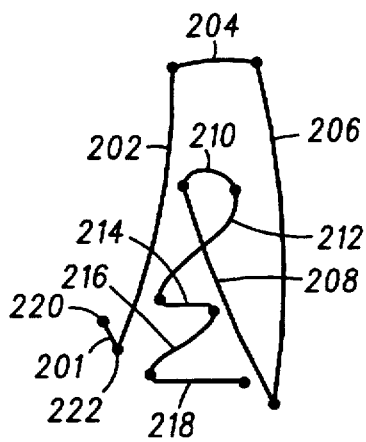
FIG. 2 illustrates segmentation points for handwritten input produced by a preferred embodiment of the present invention after step 110 of FIG. 1.
Figure 3:
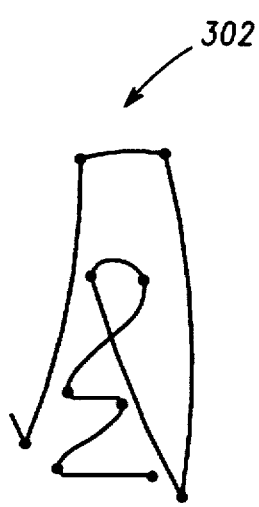
FIG. 3 illustrates segmentation points for handwritten input produced by a preferred embodiment of the present invention after step 112 of FIG. 1.

Referring now to FIGS. 2 and FIG. 3, FIG. 2 illustrates segmentation points for handwritten input produced by a preferred embodiment of the present invention after step 110 of FIG. 1. The segmentation points are obtained from a local maximum of the angle change that exceeds a preset threshold and from the beginnings and ends of pen down segments. Thus, in FIG. 2, segments (201, 202, 204, 206, 208, 210, 212, 214, 216, 218) are determined. Each of the above segments are bounded by two segmentation points.

FIG. 3 illustrates segmentation points (302) for handwritten input produced by a preferred embodiment of the present invention after step 112 of FIG. 1. Note that the segmentation point 220 in FIG. 2 is eliminated in FIG. 3 since it represents a spurious segmentation point. That is, segment 201 represents a 'hook', i.e., an artifact, so segmentation point 220 is removed. The rule for determining that the segmentation point 220 is spurious is that segmentation 220 lies less than a prespecified distance from the segmentation point 222, which has a larger angle change when compared with segmentation point 220.

Figure 4:
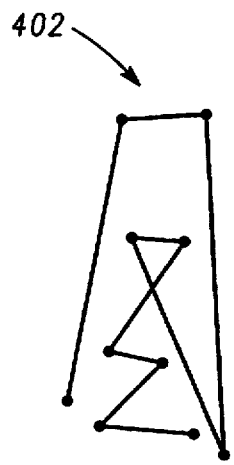
FIG. 4 illustrates a sequence of straight line segments (strokes) representing the handwritten input of FIG. 2.

FIG. 4 illustrates a sequence (402) of straight line segments (strokes) representing the handwritten input of FIG. 2. The sequence of points between any two consecutive segmentation points shown in FIG. 3 is replaced by a straight line in FIG. 4.

Figure 5:
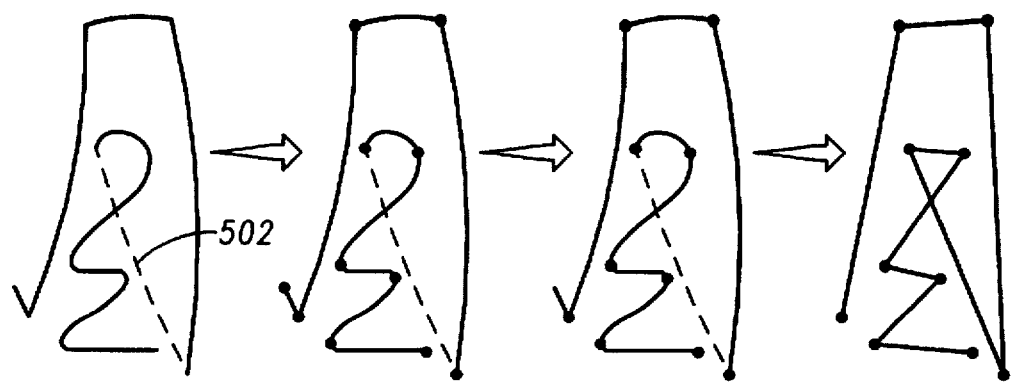
FIG. 5 illustrates determining a sequence of straight line segments (strokes) representing handwritten input wherein an input pen is lifted (dashed line).

Sometimes a pen is raised from the input device (penup segment) and then is placed at a new position to continue the handwritten input. An example of this is shown in FIG. 5. The dotted line (502) represents the segment where the pen was lifted. At the end preprocessing, the penup stroke is indistinguishable from pendown strokes.

Figure 6:
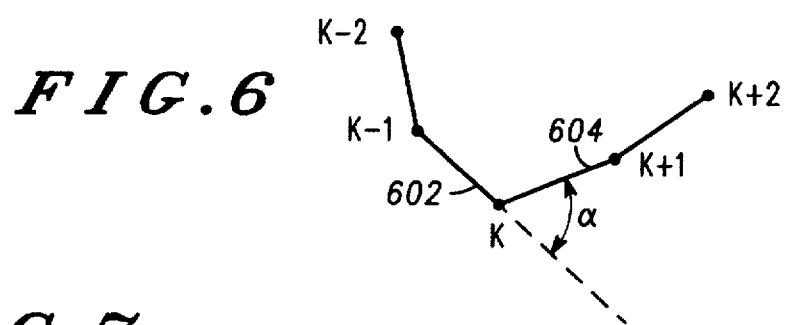
FIG. 6 is an exploded view illustrating a change in angle determination.

FIG. 6 is an exploded view illustrating a change in angle determination. A first vector (602) joins previous raw point k−1 (from original input data) to the current point k. A second vector (604) joins the current point k to the next point k+1. The angle $\alpha$ between the two vectors is the angle change at point k. At a beginning point of a pendown segment and also at the end point of a pendown segment, the angle change is set to zero.

Figure 7:
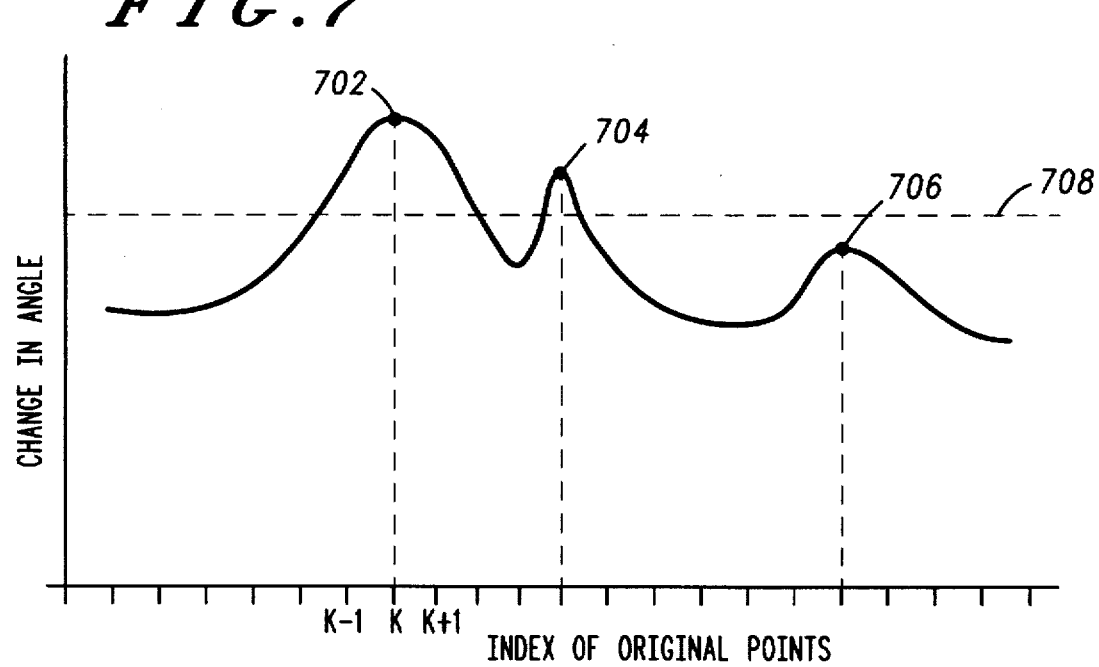
FIG. 7 illustrates graphically the angle change values calculated for each point in FIG. 6.

FIG. 7 illustrates graphically the angle change values calculated for each point in FIG. 6 plotted against the index k of the original points. The figure shows three local maxima (702, 704, 706) for the angle changes. The maxima 702 and 704 exceed the preset threshold 708 and hence are selected as potential segmentation points. However, maximum 706 is less than the preset threshold 708, and thus is not selected as a segmentation point. The spatial distance between the points represented by 702 and 704 is less than a predetermined distance threshold, and hence only one of the two points represented by the maxima is a useful segmentation point and the other is a spurious segmentation point. Since the maximum 702 is greater than the maximum 704, the point represented by maximum 702 is the useful segmentation point, and the point represented by the maximum 704 is a spurious segmentation point.

Two thresholds must be estimated. The first threshold 708 is used to compare the angle changes at the local maxima of the angle change curve (FIG. 7) in order to select potential segmentation points. The second threshold is used to compare the distance between two segmentation points to separate useful and spurious segmentation points. When the preprocessing method of the present invention is used with a handwriting character recognizer, the exact values for the two thresholds are not critical as long as an error-tolerant character recognizer is used. In performing any experimental tuning of these or any other parameters for creating a specific embodiment of the invention, the desired goal is to attain segmentation which is as consistent as possible across multiple instances of particular character classes. This should be done empirically by examining how the procedure segments vary according to actual samples of the writing to be recognized.

The set of segmentation points in accordance with the present invention defines a set of corresponding straight line strokes. These straight line strokes can then be forwarded to a stroke-based character recognizer for recognition of the handwritten input.

Figure 8:
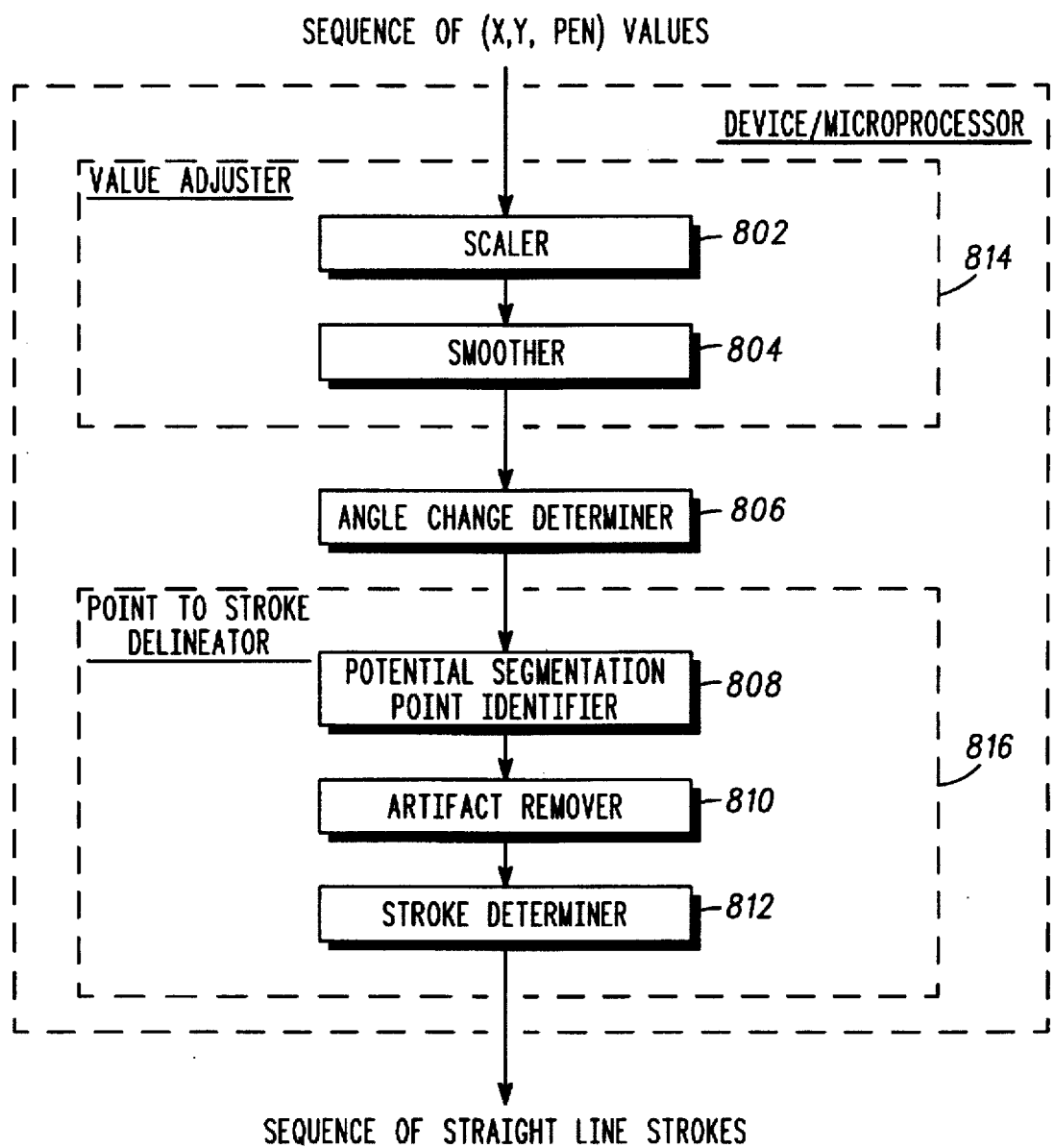
FIG. 8 is a block diagram of a device/handwriting recognition microprocessor for recognizing handwritten characters which have a preponderance of straight line segments in accordance with the present invention.

As shown in FIG. 8, the present invention may also be implemented by a device/handwriting recognition microprocessor for, upon receiving handwritten character input as a sequence of (x,y, pen) points where x and y are coordinates in a two dimensional coordinate system and pen is a binary value indicating an associated penup/pendown state, recognizing a handwritten character composed of a plurality of (x,y, pen) values. The device/handwriting recognition microprocessor includes an angle change determiner (806), a potential segmentation point identifier (808), an artifact remover (810), and a stroke determiner (812). Where selected, said device/microprocessor includes at least one of: a scaler (802) and a smoother (804). The scaler (802) is used for scaling the x,y coordinates so the resulting coordinate values are within prespecified limits. The smoother (804) may immediately precede the angle change determiner (806) or may be operably coupled to the scaler (802) (where a scaler is utilized), and is used for smoothing the scaled x, y coordinates to remove high-frequency noise. The angle change determiner (806) is operably coupled to receive the sequence of (x,y, pen) points and is used for determining a change in angle at each (x,y, pen) point. Where selected, the angle change determiner (806) may be coupled to receive the output of one of: the scaler (802) and the smoother (804). The potential segmentation point identifier (808) is operably coupled to the angle change determiner (806) and is used for identifying potential segmentation points as pendown points whose angle change exceeds a preset threshold. The artifact remover (810) is operably coupled to the potential segmentation point identifier (808) and is used for removing spurious segmentation points to provide useful segmentation points. The stroke determiner (812) is operably coupled to the artifact remover (810) and is used for determining a sequence of straight line strokes to represent the handwritten input from the useful segmentation points.

In another embodiment, the device/handwriting recognition microprocessor may include: A) an angle change determiner (806), operably coupled to receive the (x,y, pen) points, for determining a change in angle at each (x,y, pen) point; and B) a point to stroke delineator (816), operably coupled to the angle change determiner, for determining useful segmentation points and generating a sequence of straight line strokes to represent the handwritten input from the useful segmentation points. Where selected, a value adjuster (814) may be operably coupled immediately prior to the angle change determiner (806) to receive the sequence of (x,y, pen) values, for modifying said values to facilitate processing and for providing the modified values to the angle change determiner (806).

For example, the value adjuster (814) may be selected to include: A) a scaler (802), for scaling the x,y coordinates so the resulting coordinate values are within prespecified limits; and B) a smoother (804), operably coupled to the scaler, for smoothing the scaled x, y coordinates to remove high-frequency noise.

In one implementation, the point to stroke delineator (816) may include: A) a potential segmentation point identifier (808), operably coupled to the angle change determiner (806), for identifying potential segmentation points as pendown points whose angle change exceeds a preset threshold; B) an artifact remover (810), operably coupled to the potential segmentation point identifier (808), for removing spurious segmentation points to provide useful segmentation points; and C) a stroke determiner (812), operably coupled to the artifact remover (810), for determining a sequence of straight line strokes to represent the handwritten input from the useful segmentation points.

Clearly, the method of the present invention may be performed according to steps describing the method embodied in a tangible medium of/for a computer. For example, the tangible medium may be a computer diskette or a memory unit of the computer.

The present invention and its preferred embodiments relate to novel, more accurate methods of stroke segmentation for characters composed of a preponderance of straight line segments (for example, Chinese characters). In accordance with the present invention, in multiple instances of handwritten input the input is repeatedly divided into a similar set of straight line strokes each time. Such stroke segmentation aids in providing more accurate interpretation by a stroke-based character recognizer.

Those skilled in the art will find many embodiments of the present invention to be useful. One obvious advantage is that printed and cursive styles of writing look more similar to one another and thus makes the recognition task easier. Another embodiment would be the segmentation of scanned, or "off-line" writing, into strokes. A straightforward way of applying the present invention to such a task would be to perform thinning of the writing to obtain a constant-width ink curve. Stroke boundaries could then be set at both angle change maxima points and at intersection points, since the lack of temporal information makes intersections and touching bends look similar.

It will be apparent to those skilled in the art that the disclosed invention may be modified in numerous ways and may assume many embodiments other than the preferred forms particularly set out and described above. Accordingly, it is intended by the appended claims to cover all modifications of the invention that fall within the true spirit and scope of the invention and its equivalents.

What is claimed is:

1. A method of preprocessing a handwritten pen input for characters composed of a preponderance of straight line segments, comprising the steps of:

A) receiving the handwritten input as a sequence of (x, y) points where x and y are coordinates in a two dimensional coordinate system;

B) determining a change in angle at each of the points;

C) identifying potential segmentation points as each of the points having a local maximum of angle change exclusive of any other points and an angle change exceeding a preset threshold;

D) removing spurious segmentation points to provide useful segmentation points, where spurious segmentation points are each of the potential segmentation points which is less than a preset distance from another of the potential segmentation points; and E) determining a sequence of straight line strokes to represent the handwritten input from the useful segmentation points.

2. The method of claim 1, including, after step A, scaling the x,y coordinates so the resulting coordinate values are within prespecified limits.

3. The method of claim 1, including, after step A, smoothing the x, y coordinates to remove high-frequency noise.

4. The method of claim 1 wherein, in step E, a straight line stroke is inserted between any two useful consecutive segmentation points, including two consecutive segmentation points having a pen-up segment between them.

5. The method of claim 1 wherein each straight line stroke is described by four parameters: x coordinate of a midpoint of the straight line stroke, y coordinate of the midpoint of the straight line stroke, a length of the straight line stroke, and an angle of the straight line stroke with respect to a predetermined reference.

6. A method of recognizing a handwritten character comprising the steps of:

A) receiving the handwritten input as a sequence of (x, y) points where x and y are coordinates in a two dimensional coordinate system;

B) determining a change in angle at each of the points;

C) identifying potential segmentation points as each of the points having a local maximum of angle change exclusive of any other points and an angle change exceeding a preset threshold;

D) removing spurious segmentation points to provide useful segmentation points, where a spurious segmentation point is a potential segmentation point which is less than a preset distance from another of the potential segmentation points;

E) determining a sequence of straight line strokes to represent the handwritten input from the useful segmentation points; and F) using the sequence of straight line strokes to determine the identity of said handwritten character.

7. The method of claim 6 including, after step A, scaling the x,y coordinates so the resulting coordinate values are within prespecified limits.

8. The method of claim 6 including, after step A, smoothing the x, y coordinates to remove high-frequency noise.

9. The method of claim 6 wherein, in step E, a straight line stroke is inserted between any two useful consecutive segmentation points, including two consecutive segmentation points having a pen-up segment between them.

10. The method of claim 6 wherein each straight line stroke is described by four parameters: x coordinate of a midpoint of the straight line stroke, y coordinate of the midpoint of the straight line stroke, a length of the straight line stroke, and an angle of the straight line stroke with respect to a predetermined reference.

11. The method of claim 6 wherein the steps to perform the method are embodied in a tangible medium of/for a computer.

12. The method of claim 11 wherein the tangible medium is a computer diskette.

13. The method of claim 11 wherein the tangible medium is a memory unit of the computer.

14. A device/handwriting recognition microprocessor for, upon receiving handwritten character input as a sequence of (x,y) points where x and y are coordinates in a two dimensional coordinate system, recognizing a handwritten character composed of a plurality of (x,y) values, comprising:

A) an angle change determiner for determining a change in angle at each of the sequence of (x,y) points;

B) a potential segmentation point identifier, operably coupled to the angle change determiner, for identifying potential segmentation points as each of the points having a local maximum of angle change exclusive of any other points and an angle change exceeding a preset threshold;

C) an artifact remover, operably coupled to the potential segmentation point identifier, for removing spurious segmentation points to provide useful segmentation points, where a spurious segmentation points is a potential segmentation point which is less than a preset distance from another of the potential segmentation points; and D) a stroke determiner, operably coupled to the artifact remover, for determining a sequence of straight line strokes to represent the handwritten input from the useful segmentation points.

15. The device/microprocessor of claim 14, further including a scaler, operably coupled for receiving the sequence of (x,y) points, for scaling the x,y coordinates so the resulting coordinate values are within prespecified limits and providing scaled x,y coordinates to the angle change determiner.

16. The device/microprocessor of claim 14, further including a smoother, operably coupled for receiving the sequence of (x,y) points, for smoothing the x, y coordinates to remove high-frequency noise.

17. The device/microprocessor of claim 14 wherein a straight line stroke is inserted between any two useful consecutive segmentation points, including two consecutive segmentation points having a pen-up segment between them.

18. The device/microprocessor of claim 14 wherein each straight line stroke is described by four parameters: x coordinate of a midpoint of the straight line stroke, y coordinate of the midpoint of the straight line stroke, a length of the straight line stroke, and an angle of the straight line stroke with respect to a predetermined reference.

19. A device/handwriting recognition microprocessor for, upon receiving handwritten character input as a sequence of (x,y) points where x and y are coordinates in a two dimensional coordinate system, recognizing a handwritten character composed of a plurality of (x,y) values, comprising:

A) an angle change determiner, operably coupled to receive the sequence of (x,y) points, for determining a change in angle at each of the sequence of (x,y) points; and B) a point to stroke delineator, operably coupled to the angle change determiner, for determining useful segmentation points, where useful segmentation points are each of the sequence of points where the change in angle exhibits a local maximum exclusive of any other points and where the change in angle exceeds a preset threshold but is at least a preset distance from another of the sequence of points that has the change of angle exceeding the preset threshold, and generating a sequence of straight line strokes between the useful segmentation points to represent the handwritten input.

20. The device/handwriting recognition microprocessor of claim 19, further including a value adjuster, operably coupled immediately prior to the angle change determiner, to receive the sequence of (x,y) values, for modifying said values to facilitate processing.

21. The device/handwriting recognition microprocessor of claim 20 wherein the value adjuster includes:

A) a scaler, for scaling the x,y coordinates so the resulting coordinate values are within prespecified limits; and B) a smoother, operably coupled to the scaler, for smoothing the scaled x, y coordinates to remove high-frequency noise.

22. A method comprising the steps of:

sampling points of handwriting input to a handwriting recognizer wherein vectors are formed between the points;

determining for each one of the points a change of angle between two of the vectors joining at the one of the points;

comparing the change of angle for each one of the points with a preset threshold and identifying points as potential segmentation points where, exclusive of any other points, the change of angle for each one of the potential segmentation points is a maximum vis-a-vis the change of angle at adjacent points and is greater than the preset threshold;

removing spurious segmentation points where spurious segmentation points are each of the potential segmentation points having a change of angle that is a local maximum and is greater than the preset threshold but is less than a preset distance from another of the potential segmentation points having a change of angle that is a local maximum and is greater than the preset threshold; and determining a sequence of straight line strokes between the potential segmentation point for each one of the points.

23. A method according to claim 22 wherein the method further includes smoothing the points before determining for each one of the points a change of angle.

24. A method according to claim 23 wherein the step of smoothing the points includes weighting a first point with a point nearest to the first point to compute an average, and replacing the first point with the average.

25. A method according to claim 22 wherein the step of determining for each one of the points a change of angle includes:

joining a first point with a previous point by a first vector; and joining the first point with a next point by a second vector, such that the angle between the first vector and second vector is the change of angle.

26. A handwriting recognizer comprising:

an angle change determiner wherein for each of a set of points sampled along handwriting input to a handwriting recognizer wherein vectors are formed between each of the set of points, the angle change determiner determines a change of angle between two of the vectors joining at each one of the set of points;

a potential segmentation point identifier coupled to the angle change determiner which compares the change of angle for each one of the set of points with a preset threshold and identifies points as potential segmentation points where, exclusive of any other points, the change of angle for each one of the potential segmentation points is a maximum vis-a-vis the change of angle at adjacent points and is greater than the preset threshold;

an artifact remover coupled to the potential segmentation point identifier which removes spurious segmentation points where spurious segmentation points are each of the potential segmentation points having a change of angle that is a maximum vis-a-vis the change of angle at adjacent points and is greater than the preset threshold but is less than a preset distance from another of the potential segmentation points having a change of angle that is a maximum vis-a-vis the change of angle at adjacent points and is greater than the preset threshold; and a stroke determiner coupled to the artifact remover which determines a sequence of straight line strokes between the potential segmentation point for each one of the set of points.

27. A handwriting recognizer according to claim 26 wherein the handwriting recognizer further comprises a smoother coupled to the angle change determiner to smooth the set of points before the angle change determiner determines a change of angle for each one of the set of points.

28. A method of preprocessing a handwritten pen input for characters composed of a preponderance of straight line segments, comprising the steps of:

A) receiving the handwritten input as a sequence of (x, y) points where x and y are coordinates in a two dimensional coordinate system;

B) determining a change in angle at each of the points;

C) identifying useful segmentation points from points having an angle change exceeding a preset threshold;

D) determining a sequence of straight line strokes to represent the handwritten input from the useful segmentation points;

E) inserting a straight line stroke between any two consecutive useful segmentation points having a pen-up segment between them; and F) using the sequence of straight line strokes to determine the identity of the handwritten character.

29. A method of preprocessing a handwritten pen input for characters composed of a preponderance of straight line segments, comprising the steps of:

A) receiving the handwritten input as a sequence of (x, y) points where x and y are coordinates in a two dimensional coordinate system;

B) determining a change in angle at each of the points;

C) identifying potential segmentation points as each of the points having an angle change exceeding a preset threshold;

D) removing spurious segmentation points to provide useful segmentation points, where spurious segmentation points are each of the potential segmentation points having an angle change exceeding the preset threshold but are less than a preset distance from another of the potential segmentation points having an angle change exceeding the preset threshold; and E) determining a sequence of straight line strokes to represent the handwritten input from the useful segmentation points; and F) inserting a straight line stroke between any two consecutive useful segmentation points having a pen-up segment between them.

30. A device/handwriting recognition microprocessor for, upon receiving handwritten character input as a sequence of (x,y) points where x and y are coordinates in a two dimensional coordinate system, recognizing a handwritten character composed of a plurality of (x,y) values, comprising:

A) an angle change determiner for determining a change in angle at each of the sequence of (x,y) points;

B) a potential segmentation point identifier, operably coupled to the angle change determiner, for identifying potential segmentation points as each of the sequence of points whose angle change exceeds a preset threshold;

C) an artifact remover, operably coupled to the potential segmentation point identifier, for removing spurious segmentation points to provide useful segmentation points; and D) a stroke determiner, operably coupled to the artifact remover, for determining a sequence of straight line strokes to represent the handwritten input from the useful segmentation points, wherein the stroke determiner inserts a straight line stroke between any two useful consecutive segmentation points having a pen-up segment between them.

* * * * *